Dec. 15, 1970  R. E. LANGLOIS ETAL  3,546,898
NONUNIFORM MOTION PRODUCING STRUCTURE FOR
PRODUCING FIBROUS MATS
Filed Dec. 28, 1967  2 Sheets-Sheet 1
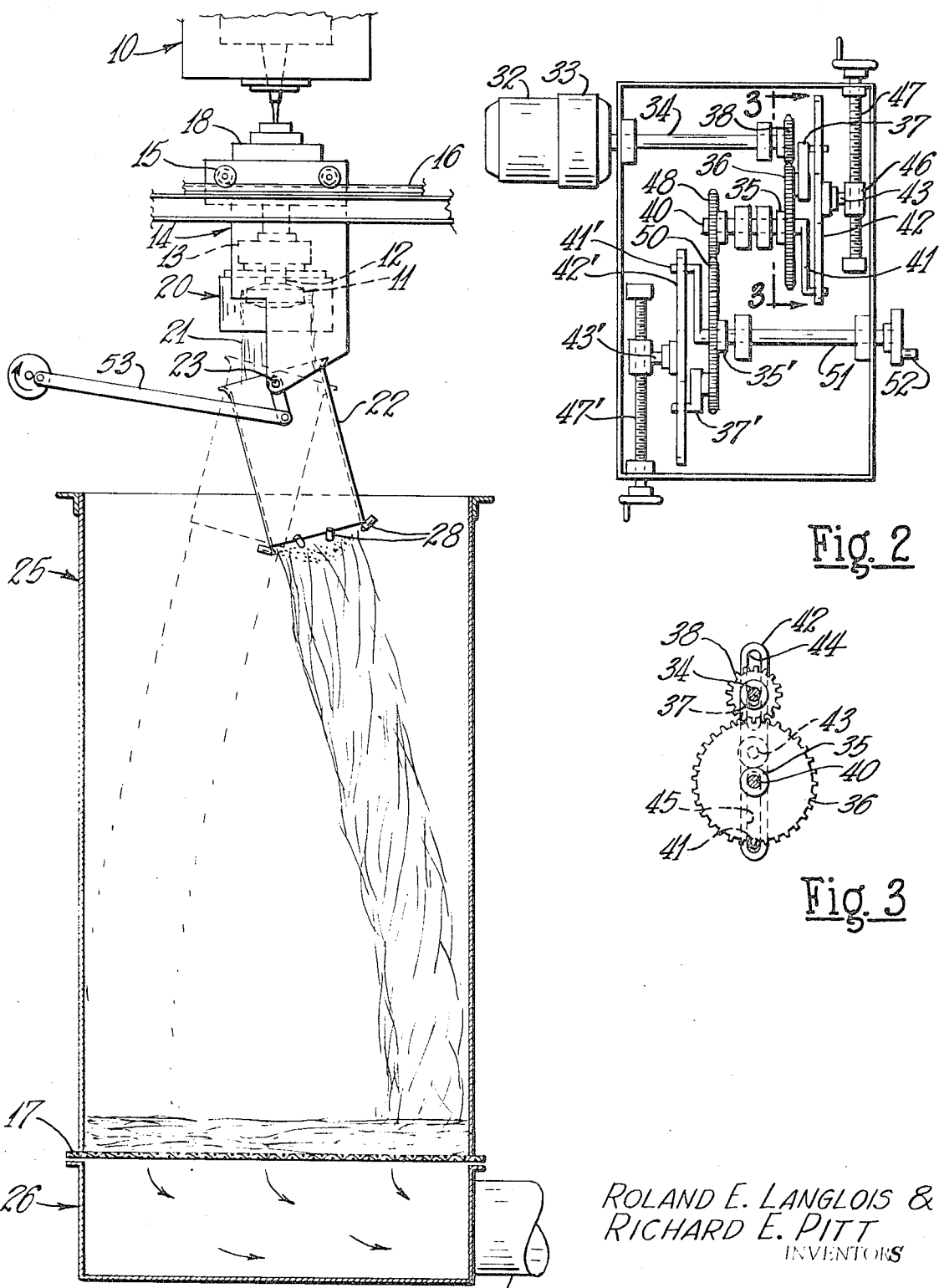
ROLAND E. LANGLOIS &
RICHARD E. PITT
INVENTORS
BY
Staelin & Overman
ATTORNEYS Dec. 15, 1970  R. E. LANGLOIS ET AL  3,546,898
NONUNIFORM MOTION PRODUCING STRUCTURE FOR
PRODUCING FIBROUS MATS
Filed Dec. 28, 1967  2 Sheets-Sheet 2

ROLAND E. LANGLOIS &
RICHARD E. PITT
INVENTORS

BY Staelin & Overman
ATTORNEYS

United States Patent Office 3,546,898
Patented Dec. 15, 1970

1

3,546,898
NONUNIFORM MOTION PRODUCING STRUCTURE FOR PRODUCING FIBROUS MATS
Roland E. Langlois and Richard E. Pitt, Newark, Ohio, assignors to Owens-Corning Fiberglas Corporation, a corporation of Delaware
Filed Dec. 28, 1967, Ser. No. 694,325
Int. Cl. C03b 37/00
U.S. Cl. 65—2                                    11 Claims

ABSTRACT OF THE DISCLOSURE

Apparatus for oscillating a stream of material from side to side across a moving surface in such manner as to provide uniform deposition. Uniform deposition is accomplished by drive mechanism which speeds up rotation of a crank arm at the ends of its connecting rod movement, and by slowing the crank arm rotation intermediate the ends of its connecting rod movement. A further correction in reciprocatory motion of the connecting rod is provided by superimposing a second cyclic speeding up and slowing down of the crank arm onto the first cyclic speeding up and slowing down of the speed of rotation of the crank arm. Uniform deposition of material on a moving surface is improved where the superimposed cyclic movement has a frequency twice that of the cyclic movement of the driven structure. The oscillatory drive mechanism has particular advantages in the deposition of a veil of glass fibers onto the surface of a moving conveyer as occurs in the manufacture of glass fiber mats of insulation and the like. The rotational drive mechanism wherein one cyclic rotational movement is superimposed on a second cyclic rotational movement is disclosed as having uses in mechanisms other than oscillatory producing mechanisms.

BACKGROUND OF THE INVENTION

Mats of glass fibers for insulation and the like are produced by oscillating a veil of glass fibers sideways across a moving conveyer. The veil is produced by a jet of high velocity gases directed downwardly at streams of molten glass to attenuate the fibers and carry them downward at high velocity to the collecting conveyer. The collecting conveyer is many times wider than the veil of glass fibers, and so the conveyer is covered by oscillating the veil from side to side across the conveyer. The conveyer is formed by a screen or other foraminous structure and is situated over a suction box, so that the jet of high velocity gases is drawn through the conveyer to help deposit and hold the fine glass fibers upon the surface of the conveyer. The jet of high velocity gases has a considerable amount of energy causing a high degree of turbulence as well as channeling of the flow path through the conveyer and suction box. This turbulence and channeling is affected by the location of the gas withdrawal conduits leading out of the suction box; and is further affected by build-up of solid deposits upon the surface of the conveyer. One effect of the complicated flow patterns is that deposition of glass fibers upon the surface of the conveyer is not uniform. In order to assure that manufacturing specifications are adhered to, the sides of the mat must be trimmed off, and an excess of glass fibers appleid to the surface of the conveyer to assure that the minimum deposition equals the minimum allowable weight per unit of area.

An object of the present invention is the provision of a more uniform deposition of glass fibers upon the surface of a moving conveyer from an oscillating fiber distributor.

Another object of the present invention is the provision of a new and improved mechanism for producing nonuniform rotary motion and which superimposes one cyclic variation on another cyclic variation.

SUMMARY

It has been discovered that although the uneven deposition of glass fibers on the surface of a moving conveyer by an oscillating structure is complicated and variable, it can be off set by superimposing two types of cyclic rotary movement into the crank arm drive for the oscillating structure. It has been found that this type of corrective movement will compensate for a greater build up at one side of the conveyer than occurs at the other side of the conveyer without moving the veil directing mechanism from its central location and without shifting the limits of oscillation from a conveyer centered position. It has been found that while either shifting the veil distributing mechanism off center, or shifting the limits of oscillation off center, will in some instances provide a more uniform distribution for some operation conditions of mass flow rate, etc., a slight change in these conditions will cause the fiber distribution to become unbalanced in a new way.

According to the invention, these difficulties are overcome by keeping the veil distributor and its oscillatory limits generally centered over the conveyer while speeding up and slowing down the crank arm which produces the oscillation. According to the invention, the veil distributor is moved more quickly over the side of the conveyer where an excess of deposit had previously occurred and less quickly over the opposite side of the conveyer. This slowing down on one half of the cycle and speeding up on the other half of the cycle may cause a depletion at the center of the conveyer and a build up at both opposite sides of the conveyer, and this condition in turn is compensated for by speeding up and slowing down the cyclic movement first described at a rate twice that of the first cyclic movement. While these two degrees of cyclic variation in oscillatory movement can be produced by programming the flow of electricity to an electric motor, or by programming the flow of pressure fluid to a hydraulic motor, it is conveniently accomplished mechanically in a rugged and reliable manner by oscillating the material directing device by a connecting rod driven by a crank arm which is revolved at changing rates of speed. The crank arm is caused to be rotated at its highest rate of speed when the connecting rod is at its limits of travel, and the crank arm is caused to have a minimum speed of rotation when the connecting rod is midway between its limits of travel. The speeding up and slowing down of the rotation of the crank arm may be accomplished with elliptical gears arranged to drive the crank arm. When elliptical gearing which drives the crank arm is in turn driven by conventional gearing, the driving gear of which rotates at twice the speed of the elliptical drive gear, the conventional gearing is in turn driven by another set of elliptical gears. Such an arrangement is capable of compensating for a fixed set of conditions producing an unbalance of deposit across the width of the conveyer. The preferred drive structure, however, is one having two cyclic drive mechanisms, the first of which is driven at twice the speed of the sceond drive mechanism, and both of which can be infinitely varied during operation to either speed up or slow down the portions of its cycle which occur when the connecting rod is at its limits of travel. The preferred adjustable cyclic drive mechanism comprises a pair of oppositely extending crank arms the laterally projecting ends of which are received in the slot of a crank connecting member that is rotatable about an axis parallel to the axis of the crank arms, and the position of which can be laterally moved in the plane connecting the axis of rotation of the crank arms. Such a structure is capable of various embodiments as will be apparent from the detailed description of applicants' preferred embodiments hereinafter described.

BRIEF DESCRIPTION OF THE DRAWINGS

FIG. 1 is an end elevational view of a rotary glass fiber attenuator, veil directing mechanism, and collecting conveyer which embody principles of the present invention;

FIG. 2 is a somewhat schematic plan view of one embodiment of drive mechanism for driving the oscillatory structure of the veil directing mechanism shown in FIG. 1;

FIG. 3 is a cross-sectional view taken approximately on the lines 3—3 of FIG. 2;

DESCRIPTION OF THE PREFERRED EMBODIMENTS

Figure 4:
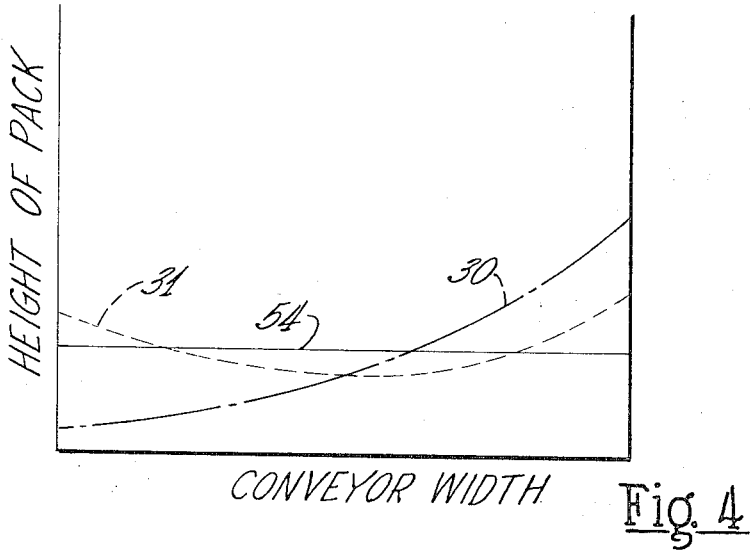
FIG. 4 is a typical diagram of the thickness of glass fibers at various locations across the width of the conveyer.

Although the invention may be used in any type of apparatus wherein a stream of material is oscillated from side to side over a relatively moving surface for the purpose of depositing material on the surface, it is herein shown and described as embodied in apparatus for producing glass fiber mats of the type used as building insulation, etc. The apparatus shown in FIG. 1 comprises a forehearth 10 which conducts molten glass from a furnace, not shown, to a plurality of in line fiber producing spinners 11, only one of which is shown in the drawings. The spinner 11 has a hollow quill or drive shaft 12 which extends upwardly through an annular electrical drive motor 13 which in turn is supported by a movable carriage 14. The carriage 14 has flanged wheels 15 which ride on a pair of rails 16 which extend crosswise over the collecting conveyer 17. The carriage 14, therefore and everything supported thereon, can be easily moved out from beneath the forehearth 10 for appropriate maintenance etc., when the glass issuing from the forehearth is diverted by mechanism not shown. The carriage 14 also has mounted thereon a refractory lined funnel 18 which receives the stream of molten glass from the forehearth 10 and directs it into the hollow quill leading to the spinner 11. A stream of molten glass from the forehearth 10 falls upon a flat plate in the spinner 11 and is thrown by centrifugal force through a plurality of small openings in the periphery of the spinner 11 causing the glass to issue forth as small molten streams. These small molten streams are thrown into the path of high velocity downwardly directed jets of gas which extend around the periphery of the spinner. These jets may be of any suitable high velocity gas such as steam, but frequently are hot products of combustion which help maintain the streams of glass in a molten condition as they are violently forced downward and attenuated. The jets and burners for generating the products of combustion are shown generally at 20 and extend annularly around the periphery of the spinner 11. The attenuated glass fibers are swept downwardly at a high rate of speed by a large quantity of turbulent gases which issue from the burner and jets 20 is a volumn of gases and fibers known as a veil 21.

The veil of gases and fibers, although highly turbulent, remain in a generally cylindrically shaped stream which must be oscillated back and forth across the moving surface of the conveyer if a mat is to be produced. It is not feasible to either move the carriage 14, or oscillate the spinner 11, and so some sort of directing device must be utilized to direct the stream of gas and fibers laterally across the conveyer. Various types of directing mechanisms such as diverting vanes, diverting gas streams, or fluidic devices can be used, but in the device shown in FIG. 1. a guide tube 22 is used. The guide tube 22 is pivoted to the lower end of the carriage structure 14 about an axis 23 running longitudinally of the conveyer, and has an outwardly flared upper end which receives the veil 21 throughout oscillatory movement between two predetermined limits of oscillation positioned to cover the conveyer with glass fibers. The guide tube 22 acts somewhat like a venturi in which the stream of moving gases is pulled into engagement with the side walls of the tube and is thereby directed according to the position of the tube. The solid lines indicate one limit of oscillation of the guide tube 22 and the dotted lines indicate the other limit of oscillation of the guide tube 22. The guide tube 22 is oscillated between these two positions by the drive structure 24 shown generally in FIG. 2, and the two extreme positions of the guide tube are determined to direct the veil or stream at respective side edges of the conveyer. A rectangularly shaped box or forming hood 25 is positioned around that portion of the conveyor on which the fibers are to be collected, and any stray glass fibers may impinge upon the side walls of the forming hood and be reflected onto the top surface of the conveyor 17. The conveyor 17 is a foraminous member, usually a woven screen, through which the stream of gases pass, and the flow of gases is aided by a suction box 26 located beneath the top surface of the conveyor. The suction box 26 is evacuated by one or more conduits 27 usually located at one side or the other of the suction box. A plurality of spray nozzles 28 are affixed to the bottom of the guide tube 22 for directing a water solution of phenolformaldehyde or other thermosetting resin binder onto the glass fibers prior to their collection on the top surface of the conveyor. The conveyor is caused to move forwardly out of the plane of the drawing at a fixed control rate of speed to transport the mat of binder wetted fibers to an oven where the water is removed and the binder hardened into a thermoset condition to adhere the fibers permanently together.

One of the difficulties of prior art mechanisms is that the mat which is laid down upon the top surface of the conveyor 17 is not of a uniform depth. The depth which is achieved may vary from location to location along the conveyer, and will further vary with the mass rate of flow of fibers and gases. It is a quite common occurrence for the depth of fibers at one side of the conveyer to be greater than at the opposite side of the conveyer, and this condition is shown somewhat exaggerated by the dot-dash line 30 of FIG. 4. It is believed that some of this uneven distribution is caused by the uneven withdrawal of gases through the conveyor which in turn may be induced by the location of the suction conduits 27.

Various schemes have been tried in an attempt to compensate for the uneven distribution shown by the dot-dash line 30. In one scheme, the limits of oscillation were shifted to extend the tilting movement to a greater degree on one side of the conveyer than on the opposite side of the conveyer. It was found that it did not materially improve the distribution since while it decreased the depth of deposit at one side of the conveyer, an uneven build-up occurred at the opposite side of the conveyer, apparently by reason of a reflection from the side walls of the forming hood 25. Offsetting of the guide tube 22 relative to the conveyer likewise does not produce the desired uniform distribution across the width of the conveyer.

According to the invention it has been discovered that the distribution of the fibers across the width of the conveyer is improved from the condition represented in somewhat exaggerated form by the dot-dash line 30 of FIG. 4 to the dashed line 31 when the guide tube 22 has its oscillatory movements speeded up during one half of its cycle, and slowed down during the other half of its oscillatory cycle. This, however, is still not the desired uniform distribution, and it has further been found that a generally uniform distribution is achieved when the cycle giving the distribution 31 is further speeded up and slowed down at a cyclic rate which is twice that of the cycle giving the distribution 31. For uniform distribution, therefore, it is necessary that the structure which speeds up and slows down the oscillatory movement of the guide tube, be in turn driven by a structure which cyclically speeds up and slows down at a rate twice that of the first described cycle. One type of drive structure which will produce this complicated type of oscillatory movement is shown in FIGS. 2 and 3 of the drawings.

The drive structure shown in FIGS. 2 and 3 generally comprsies an electric motor 32 and gear reducer 33 which supply a constant r.p.m. to the drive shaft 34. The drive shaft 34 provides uniform rotation to an annular input shaft 35, which in the present instance is the hub of an input gear 36 having a crank arm 37 thereon. The input gear 36 is driven by a suitable pinion gear 38 affixed to the drive shaft 34.

In the present instance, the input shaft 35 is journaled on a first intermediate shaft 40 that is suitably journaled for rotary movement. The intermediate shaft 40 is provided with a crank arm 41 thereon which is caused to be driven at a non-uniform cyclic speed by the input crank arm 37 through a first rotatable force transfer member 42. The force transfer member 42 is rotatable about a shaft 43 that is parallel with the intermediate shaft 40 and which shaft 43 is positioned off center with respect to the crank arms 37 and 41 when they are in their oppositely extending positions. The positions of the shaft 43 just described can be clearly seen in FIG. 3. Force transfer member 42 has in line slots 44 and 45 therein for receiving the lateral projections of the crank arms 37 and 41 respectively. In the arrangement shown in FIG. 3, the distance between the lateral projection of the crank arm 37 and the shaft 43 is less than the distance between the lateral projection of the crank arm 41 and the shaft 43. Upon rotation of the input gear 36, the crank arm 37 causes the force transfer member to be rotated at instantaneous rates which decrease as the force transfer member is rotated 180° from the position shown in FIG. 3. Referring to FIG. 3, it will be seen that in the initial position shown, angular movement of the crank arm 37 produces a greater angle of movement of the force transfer member 42 relative to the shaft 43. When the input crank arm 37, however, is rotated 180°, the lateral projection of the crank arm 37 will be at its greatest distance from the shaft 43 so that for a uniform angle of movement of the crank 37 about the input shaft 35, causes the force transfer member 42 to be moved by a lesser angle. There is, therefore, a slowing down of the angular rotation of the force transfer member 42 as it moves from the position shown in FIG. 3 to a position 180° therefrom; and there will be a speeding up in the rate of movement of the force transfer member 42, as it moves from the 180° position just described, to the initial position again shown in FIG. 3. There is, therefore, one minimum speed and one maximum instantaneous speed of rotation for the force transfer member 42 during each 360° of its rotation.

The force transfer member 42 in turn drives the intermediate shaft 40 by the crank arm 41 which has a further variation in its instantaneous speeds by reason of the changing location of its lateral projection relative to the shaft 43 of the force transfer member. The intermediate shaft 40 therefore has a minimum and a maximum instantaneous speed of rotation during a 360° cycle of its rotation—its maximum speed being in the position shown in FIG. 3 and its minimum speed being 180° therefrom. The extent of the variation in cyclic speed can be changed by changing the position of the shaft 43 relative to the input and intermediate shafts 35 and 40, and will be constant when the shaft 43 is symmetrically positioned relative to shafts 35 and 40. The variation will increase in proportion to the distance that the shaft 43 is moved away from the shafts 35 and 40. In the embodiment shown in FIGS. 2 and 3, the shaft 43 is journaled in a movable block 46, the position of which can be changed by a lead screw 47 along the plane that is coextensive with that passing through the arms 37 and 41 when the arms 37 and 41 are oppositely extending.

The rotational movement of the shaft 40 is in turn used to drive a similar crank arm mechanism the corresponding portions of which are designated by a like reference numeral characterized further in that a prime mark is affixed thereto. A first intermediate gear 48 is affixed to the intermediate shaft 40. Gear 48 drives a second intermediate gear 50 that is affixed to the second intermediate shaft 35'. In the embodiment shown in the drawings, the first intermediate gear 48 has half the number of teeth which the second intermediate gear 50 has. The crank arm 41' in turn is affixed to the power output shaft 51; an output crank 52 is affixed to the output shaft 51; and the rotary motion of the output crank 52 is converted to oscillatory movement of the guide tube 22 by means of a connecting rod 53. The output crank 52 is so positioned that is in line with the connecting rod 53 when the crank arms 37' and 41' are in their maximum velocity positions shown in FIGS. 2 and 3. A maximum instantaneous r.p.m. is therefore imparted to the output shaft 51 when the guide tube 22 is in the solid position shown in FIG. 1.

The position of the parts shown in FIGS. 2 and 3 will be hereinafter called the maximum velocity condition.

OPERATION FIGURES 2 AND 3

The operation of the embodiment shown in FIGS. 2 and 3 will now be described starting with the parts in their maximum velocity condition, wherein the crank arms 37, 41, 37' and 41' are as shown in FIGS. 2 and 3. When the parts shown in FIGS. 2 and 3 are in their maximum velocity condition, the parts shown in FIG. 1 are in the position shown by the solid lines. In the maximum velocity condition, arm 37' is at the bottom of the gear 50 as seen in FIG. 2. The lateral projection of the crank arm 37', therefore, is at its minimum distance from the shaft of the force transmitting member 42' so that for a given increment of rotation of the gear 50, the crank arm 41' is moved by a greater increment than was the crank arm 37'. The output shaft 51, therefore, is moved at a greater instantaneous velocity than is the second intermediate gear 50 and intermediate shaft 35'. At the maximum velocity condition, the output crank 52 is in line with the connecting rod 53, and the output crank 53 has its greatest velocity condition. Oscillatory motion of the guide tube 22, therefore, is speeded up when in this limit of oscillation, shown by the solid lines. When the output shaft 51 is rotated 180°, it will assume a condition in which the guide tube 22 will be in the opposite limit of its travel as shown by the dotted lines in FIG. 1. In this condition, the lateral projection of crank arm 37' is at its farthest position from the shaft 43' while the lateral projection of crank arm 41' is at its closest position from the shaft 43'. For a given increment of rotation, therefore, of the second intermediate gear 50, the crank arm 41' will move a lesser amount, and the shaft 51 will have its minimum instantaneous velocity. Movement of the guide tube 22, therefore, is slowed down when in its dotted condition over the rate of travel it would have if the output shaft 51 were driven at a uniform velocity. This effect is to decrease the amount of deposit adjacent the left side of the conveyer to provide a pattern depicted by the dashed line 31 of FIG. 4. It will be seen, therefore, that the velocity correction as achieved by the lower half of the structure of FIG. 2 does not by itself provide the uniform fiber distribution as desired by the solid line 54 of FIG. 4.

According to the invention, the second intermediate gear 50 is rotated at a changing rate of speed to compensate for the nonuniformity as shown by the dash line 31 of FIG. 4. Gear 50 is driven by the first intermediate gear 48 which has half the number of teeth which the gear 50 has. In the maximum velocity condition, the arms 37 and 41 are in the positions as shown in FIGS. 2 and 3. In the maximum velocity condition, the arm 37 is at its closest point of travel to the shaft 43 while the arm 41 is at its greatest distance from the shaft 43. For a given increment of rotation of the arm 37, therefore, force transfer member 42 is rotated at its maximum rate, and in turn the crank arm 41 is rotated at its maximum rate so that the first intermediate shaft 40 and first intermediate gear 48 are driven at their maximum rate. As stated previously, this occurs when the structure of FIG. 1 is in its solid line position. It will, therefore, be seen that the nonuniform rotation of the first intermediate shaft 40 provides nonuniform rotation to the second intermediate gear 50, so that there is a further speed up in the velocity of oscillation of the guide tube 22 when in its solid position, and so that there is a further decrease in the amount of deposit adjacent the right hand edge of the conveyor from the condition shown by the dashed line 31 of FIG. 4. This second speed up, therefore, decreases the deposit to the condition shown generally by the solid line 54.

Because the gear 48 is half the diameter of the gear 50, the input gear 36 must make two complete revolutions for every revolution of the output shaft 51, and for every oscillatory cycle of the guide tube 22. When the crank arm 37, therefore, has rotated 180° from the position shown in FIG. 2 to the bottom of gear 36, the arm 41 will be at the top of the gear 36 and will have its minimum velocity. This will occur when the guide tube is in its vertical position and will help to increase the amount of deposit from the dashed line 31 of FIG. 4 to achieve a condition at the center of the conveyor shown by the solid line 54 of FIG. 4. Upon a second 180° of rotation of the gear 36, it will be again in the position shown in FIG. 2, at which time the second intermediate gear 50 will be 180° out of the position shown in FIG. 2. The arm 41, therefore, will have its maximum instantaneous velocity which in turn increases the instantaneous velocity over that which would be achieved by a uniform rotation of the gear 50, so that it decreases the amount of deposit adjacent the left side of the conveyor from the dashed line 31 of FIG. 4 to the solid line condition 54 of FIG. 4. A description of one half of the oscillatory cycle of the draft tube 22 has now been completed, and the return oscillation to the starting condition shown by the solid lines of FIG. 1 is achieved by a sequence starting with the velocity condition described for the dotted line position, followed by a speed up described for the vertical position, followed by a transition to the maximum velocity condition at which the guide tube is again in its solid line position. The first intermediate gear 36 is of course rotated at constant velocity by the motor and gear reducer 32 and 33 through the input shaft 34 and pinion gear 38.

EMBODIMENT OF FIGS. 5 AND 6

Figures 5, 6:
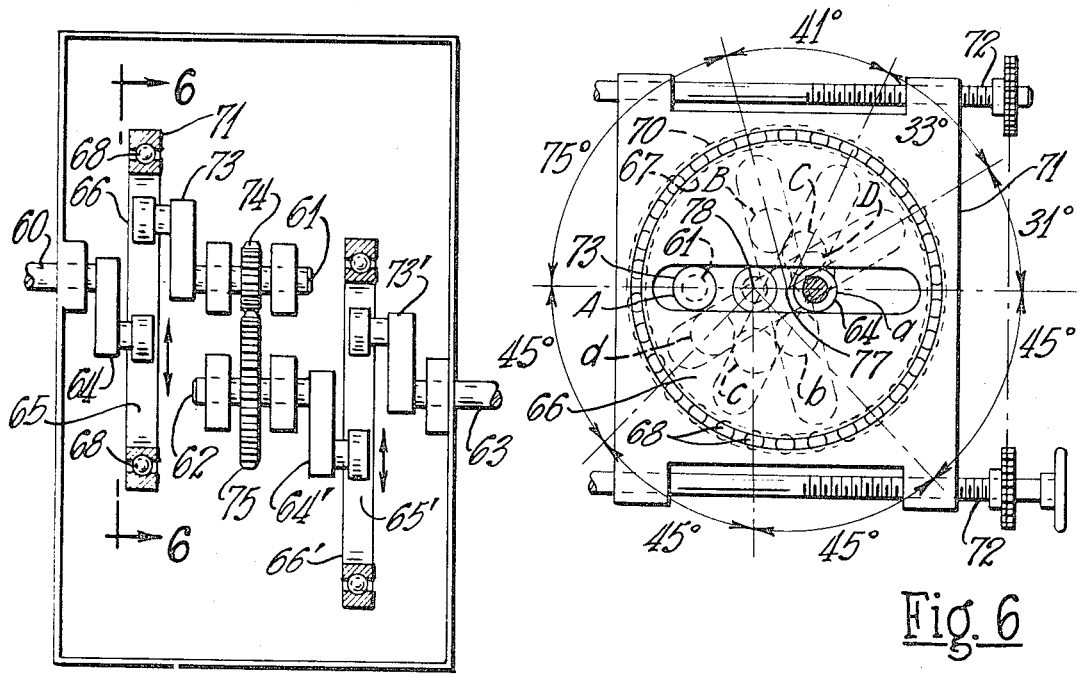
FIG. 5 is a somewhat schematic plan view of another embodiment of drive mechanism for the oscillatory structure shown in FIG. 1.
FIG. 6 is a cross-sectional view taken approximately on the line 6—6 of FIG. 5.

The embodiment shown in FIGS. 5 and 6 although constructed differently from the structure shown in FIGS. 2 and 3, performs the same general function. The embodiment shown in FIGS. 5 and 6, see FIG. 5, has an input shaft 60, a first intermediate shaft 61, a second intermediate shaft 62, and a power shaft 63. The input shaft 60 has a crank arm 64 which is received in a diametrically disposed slot 65 in a disk shaped force transfer member 66 which is retained by the inner race 67 of a roller type antifriction bearing 68. The outer race 70 of the antifriction bearing 68 is retained in a movable support block 71 that can be adjustably positioned by a pair of lead screws 72 in the direction of the arrows shown in FIG. 5. The intermediate shaft 61 in turn has a crank arm 73 the lateral projecting end of which is also received in the slot 65 so that the force transfer member 66 when rotated by the arm 64, rotates the intermediate shaft 61.

The intermediate shaft 61 is provided with a first spur gear 74 that is in mesh with a second intermediate gear 75 having a diameter twice that of the first intermediate gear 74. The second intermediate spur gear 75 drives the second intermediate shaft 62 which in turn drives a crank arm 64' that is received in the diametric slot 65' of a force transfer member 66' identically constructed with the force transfer member 66. The remaining structure shown in FIG. 5 is identical with portions already described, and the remaining portions are designated by a like reference numeral characterized further in that a prime mark is affixed thereto. A crank arm 64' is affixed to the second intermediate shaft 62 and is received in the slot 65' of the force transfer member 66', and another crank arm 73' is affixed to the output shaft 63, which likewise is received in the slot 65'.

By referring to FIG. 6, it will be seen that the center of rotation 77 of the force transfer member 66 will normally be adjusted out of a centered position between the crank arms 64 and 73. This gives rise to a condition similar to that already described for the embodiments shown in FIGS. 2 and 3. In the embodiments shown in FIGS. 5 and 6, the crank arms 64 and 73 are of equal length and the shafts 60 and 61 are coaxially mounted along the axis indicated by the point 78 of FIG. 6.

OPERATION FIGS. 5 AND 6

The parts shown in FIG. 5 are in their maximum velocity condition when the parts of FIG. 1 are in the position shown by solid lines. FIGS. 5 and 6, therefore, indicate the same condition as is indicated by the FIGS. 2 and 3.

FIG. 6 graphically indicates the manner in which nonuniform rotation of the crank arm 73 and 73' is produced by uniform rotation of the crank arm 64 and 64'. The starting condition for the maximum velocity condition of the parts is shown by the solid lines. The initial position of the crank 64 is shown by the lower case "a" and the initial position of the crank 73 is shown by the upper case "A." Succeeding positions of the cranks are shown by corresponding alphabet letters b, c, and d, and B, C, D, respectively.

In the position of the parts shown in the drawing, the lateral projection of the crank arm 64 is at its closest point to the axis of rotation 77 of the force transfer member 66 and is closer to the axis 77 than it is to the axis of rotation of the shaft 60. For a given increment of rotation of the shaft 60 therefore, the force transfer member 66 will rotate a greater amount. Force transfer member 66 in turn rotates the crank arm 73 and the crank arm 73 is thereby rotated by a greater angle than was the increment of rotation of the input shaft 60. A typical operation for one position of the parts will now be given. For the position shown, the first 45° of rotation of crank arm 64 produced a 75° rotation of the crank arm 73; a second 45° rotation of the crank arm 64 produces a 41° rotation of the crank arm 73; a third 45° rotation of the crank arm 64 produces a 33° rotation of the crank arm 73; and a fourth 45° rotation of the crank arm 64 produces a 31° rotation of the crank arm 73. It will now be apparent that the fifth, sixth, seventh and eighth 45° rotational increments of the crank arm 64 will produce successive 31°, 33°, 41° and 75° rotational increments of the crank arm 73. It will further be apparent that the rotational increments above given are only true for a given position of the block 71, and that the position of the block 71 can be varied. When the block 71 is moved to the left as seen in FIG. 6 until the point 77 coincides with the point 78, the arm 73 will have the same uniform movement as does the arm 64, and when moved further to the left, will cause the arm to start with a slower speed of rotation and then increase to a maximum speed of rotation at positions 180° out of phase with that shown in the drawings.

The crank arm 73 is directly connected to the first intermediate gear 74 which in turn drives the second intermediate gear 75. Second intermediate gear 75 has twice the number of teeth as does the first intermediate gear 74, so that the input shaft 60 and crank arm 73 must make two revolutions for every revolution of the second intermediate shaft 62. The second intermediate shaft 62 drives a crank arm 64' which in turn drives the force transfer member 65' which in turn drives the crank arm 73'. The parts 64', 66' and 73' operate in the same manner as described above for the part 64, so that the output shaft 63 in the position shown in FIG. 5 has a further increase in its incremental angular movement over the angular movement of the shaft 62. It will be apparent that the output shaft 63 will have a lesser incremental angular movement when the parts 64' and 73' are 180° from the position shown in FIG. 5, and will increase back to its maximum incremental velocity during a subsequent 180° movement to bring the crank arms 64' and 73' back again to the position shown in FIG. 5. The output shaft 63 is connected to the connecting rod 53 in the same manner as described for the embodiment of FIGS. 1 through 3 so that the same sequence of operation applies.

It will now be apparent that the drive structure as shown in FIGS. 2 and 3 and 5 and 6, provide a very definite improvement in oscillatory motion as produced by a crank arm and connecting rod which move an oscillating structure through a distance less than a major diameter of the arc generated by the point of attachment to the oscillating structure. As far as we are aware, this function has not been achieved heretofore. It will further be apparent, however, that the nonuniform rotation of the output shafts 51 or 63 as the case might be, has utility in itself apart from its operation of oscillatory producing mechanism. It is our intention, therefore, that the drive structure of the present invention will have many uses which will occur to those skilled in the art having seen its advantages as a drive for oscillating structure. It will further be apparent that the advantages described will also apply to any operation wherein a stream of material is oscillated across a moving surface as occurs during painting and coating operations, etc. It is further apparent that the speeding up and slowing down of rotary structure wherein one cycle is superimposed on another can be achieved by still other structure be it hydraulic, electrical, etc.

The device shown in FIG. 6 provides increments of movement for the output crank 73 which are different from the increments of movement of the input crank arm 64 which produced the movement. The crank arm 73, therefore, traverses identical increments of rotation during different increments of time. It will be seen that crank arm 73 traverses 75° during the time the crank arm 64 traversed 45° and that the crank arm 73 would, therefore, traverse 45° in less time than required for the crank arm 64 to traverse 45°. Succeeding increments of rotation of the crank arm 73 will take progressively longer times until the crank arm has traversed 180°. The device shown in FIG. 6, therefore, can be thought of as a "variable time base device" since predetermined increments of output rotation are achieved with varying increments of time. The device shown in FIG. 5 comprises two such "variable time base devices," as does the device shown in FIG. 2.

When the axis of rotation of the force transfer member of a "variable time base device" is in line with its driving and driven shafts, an unmodified cycle of the veil directing means is produced. When the axis of rotation of the force transfer member is moved out of line with the axis of one of its driving or driven shafts, a speeding up of a portion of the unmodified cycle is produced and a slowing down of another portion of the unmodified cycle is also produced.

While the invention has been described in considerable detail, we do not wish to be limited to the particular embodiments shown and described, and it is our intention to cover hereby all novel adaptations, modifications, and arrangements thereof which come within the practice of those skilled in the art to which the invention relates.

What is claimed is:

1. Apparatus for producing fibrous packs of discontinuous fibers comprising: means for producing discontinuous fibers, a fiber collection surface, oscillatory distributing means for cyclically distributing said fibers back and forth on said fiber collection surface, and power transmission means transmitting power to said oscillatory distributing means, said transmission means including a first drive means which changes rotary motion to oscillatory motion, and a second drive means which increases the speed of oscillation from that provided when uniform rotary motion is supplied said first drive means at one limit of oscillation and correspondingly decreases the speed of oscillation from that provided when uniform rotary motion is supplied said first drive means at the other limit of oscillation.

2. Apparatus for producing fibrous packs of discontinuous fibers comprising: means for producing a stream of discontinuous fibers, a fiber collection surface, means for cyclically directing said stream of discontinuous fibers toward said fiber collection surface, oscillatory drive means for cyclically oscillating said directing means with continuing generally sinusoidal motion to distribute said stream back and forth on said fiber collection surface, and means for selectively changing the instantaneous rate of movement of said directing means in a portion of its back and forth cycle from that of said generally sinusoidal motion to provide a desired depth of fibers deposited on a portion of said collection surface different from that produced in the unmodified generally sinusoidal cycle provided by said drive means.

3. The apparatus of claim 2 wherein said means for selectively changing the instantaneous rate of movement of said directing means includes means for increasing its rate in one portion of its cycle above that provided by the unmodified cycle of said oscillatory drive, and means to decrease its rate in another portion of its cycle below that provided by the unmodified cycle by a corresponding amount.

4. Apparatus for producing fibrous packs comprising: means for producing fibers, a fiber collection surface, oscillatory distributing means for cyclically distributing said fibers back and forth over said fiber collection surface, and drive means for said oscillatory distributing means, said drive means including: first means for changing rotary motion to oscillatory motion, and second means which speeds up output of said first means from that when driven by uniform rotary motion at one limit of oscillatory movement and correspondingly decreases output at the other limit of oscillatory movement, and which further decreases the speed of oscillatory movement generally midway between said limits.

5. Apparatus for producing fibrous packs comprising: a means for producing fibers, oscillatory distributing means for cyclically distributing said fibers back and forth on a fiber collection surface, and cyclic means for selectively changing the instantaneous rate of movement of said oscillatory distributing means, said cycle means including: a first variable time base device causing the speed of the cycle to be increased at one portion of the oscillatory cycle and the speed of the cycle to be correspondingly decreased at an opposite portion of the cycle, and a second variable time base device which operates at a frequency greater than that of the first variable time base device to change the cycle intermediate said one and opposite portions.

6. Apparatus as set forth in claim 5 including: cyclic drive means providing oscillatory movement to said distributing means, said drive means including power transmission means changing circular motion to oscillatory motion, a first variable time base device causing said power transmission means to speed up at one limit of its oscillation and correspondingly slow down at the other limit of its oscillation, and a second variable time base device causing said power transmission means to speed up or slow down intermediate said limits of its oscillation.

7. Apparatus for producing fibrous packs comprising: means for producing fibers, a fiber collection surface, oscillatory distributing means for cyclically distributing said fibers back and forth over said collection surface, power transmission means changing circular motion to oscillatory motion, a first variable time base device causing said power transmission means to speed up at one limit of its oscillation and correspondingly slow down at the other limit of its oscillation, and a second variable time base device causing said power transmission means to speed up or slow down intermediate said limits of its cycle, and power means providing uniform circular motion to said power transmission means, one of said variable time base devices operating at a frequency at least twice that of the other variable time base device.

8. A method of producing uniform packs of fibers comprising the steps of: producing a continuous stream of fibers, provisionally cyclically traversing said stream of fibers back and forth over a fiber collection surface with a continuing predetermined provisional cycle, increasing the speed of the cycle at one limit of its traverse by a first amount while correspondingly decreasing the speed of the provisional cycle at the other limit of its traverse by a corresponding amount, and increasing the speed of the resultant cycle at both limits of its traverse by a second amount while decreasing the speed of the resultant cycle intermediate the limits of traverse by a corresponding second amount.

9. A method of producing uniform packs of fibers comprising the steps of: producing a multiplicity of said fibers, provisionally distributing a moving mass of said fibers back and forth over a fiber collection surface with a provisional cyclic back and forth motion the speed of which is zero at each limit of travel and which reaches a maximum between limits of travel, causing the provisional cycle to have half portions that are dissimilar by speeding up the provisional cycle at one limit of back and forth movement and slowing down the provisional cycle at the other limit of back and forth movement by a corresponding amount, and increasing the speed of the resultant cycle by a second amount at both limits of back and forth movement while decreasing the speed of the resultant cycle intermediate the limits of back and forth movement by a corresponding second amount.

10. A method of producing uniform packs of fibers comprising the steps of: distributing a moving mass of fibers back and forth over a fiber collection surface by means of oscillation produced by a crank arm and connecting rod driven by a rotating shaft; decreasing the speed of rotation of the shaft by a first amount when said crank and connecting rod are in one in-line position and decreasing the speed of rotation by a corresponding amount in the other in-line position; and increasing rotation of the shaft by a second amount at both in-line positions and decreasing rotation of the shaft by a corresponding second amount intermediate the in-line positions.

11. Apparatus for distributing fibrous material on a collection surface comprising: means for producing a stream of the materials to be collected; a collection surface; means for directing said stream of material back and forth over said collection surface and actuated by oscillating structure; a rotary drive shaft; first and second intermediate shafts, said second intermediate shaft being driven at a fraction of the speed of the first shaft; an output shaft; first means connecting said drive shaft and first intermediate shaft; said first means causing the instantaneous rate of rotation of the first intermediate shaft to be greater than that of the drive shaft on one part of its rotation and to be correspondingly less than that of the drive shaft at approximately 180 degrees therefrom; second means operatively connecting said second intermediate shaft and said driven shaft, said second means causing the driven shaft to have an instantaneous rate of rotation that is greater than that of the second intermediate shaft at one part of its rotation and to be correspondingly less than that of the drive shaft at approximately 180 degrees therefrom, and means driving said oscillating structure from said output shaft.

References Cited
UNITED STATES PATENTS

| | | | |
|---|---|---|---|
| 2,653,416 | 9/1953 | Slayter | 65—9 |
| 3,030,659 | 4/1962 | Slayter | 65—9X |
| 3,134,145 | 5/1964 | Miller | 65—9UX |
| 3,295,943 | 1/1967 | Mabru | 65—6 |

S. LEON BASHORE, Primary Examiner

R. L. LINDSAY, JR., Assistant Examiner

U.S. Cl. X.R.

65—4, 9, 11; 156—62.2; 264—9